US012668032B2

(12) United States Patent
Schlosser et al.

(10) Patent No.: US 12,668,032 B2
(45) Date of Patent: Jun. 30, 2026

(54) SEALANT DEVICE FOR SEALING A VEHICLE TYRE, PUNCTURE REPAIR KIT WITH SUCH A SEALANT DEVICE AND A METHOD FOR PRODUCING SUCH A SEALANT DEVICE

(71) Applicant: Continental Reifen Deutschland GmbH, Hannover (DE)

(72) Inventors: Florian Schlosser, Barsinghausen (DE); Rainer Detering, Neustadt am Rübenberge (DE)

(73) Assignee: Continental Reifen Deutschland GmbH, Hannover (DE)

( * ) Notice: Subject to any disclaimer, the term of this patent is extended or adjusted under 35 U.S.C. 154(b) by 107 days.

(21) Appl. No.: 18/566,632

(22) PCT Filed: Dec. 2, 2021

(86) PCT No.: PCT/DE2021/200234
§ 371 (c)(1),
(2) Date: Dec. 2, 2023

(87) PCT Pub. No.: WO2022/253373
PCT Pub. Date: Dec. 8, 2022

(65) Prior Publication Data
US 2024/0367397 A1     Nov. 7, 2024

(30) Foreign Application Priority Data
Jun. 4, 2021     (DE) .................... 10 2021 205 682.2

(51) Int. Cl.
    *B29C 73/16*     (2006.01)
    *B29L 30/00*     (2006.01)
(52) U.S. Cl.
    CPC ......... *B29C 73/166* (2013.01); *B29L 2030/00* (2013.01)

(58) Field of Classification Search
    CPC ........................... B29C 73/166; B29L 2030/00
    See application file for complete search history.

(56) References Cited

U.S. PATENT DOCUMENTS

| 8,640,744 B2 | 2/2014 | Dowel |
| 10,669,060 B2 | 6/2020 | Sekiguchi |
| | (Continued) | |

FOREIGN PATENT DOCUMENTS

| CN | 103842162 A | 6/2014 |
| CN | 112703104 A | 4/2021 |
| | (Continued) | |

OTHER PUBLICATIONS

The International Search Report and the Written Opinion of the International Searching Authority mailed on Feb. 18, 2022 for the PCT Application No. PCT/DE2021/200234 which this application claims priority.

(Continued)

*Primary Examiner* — Christopher W Raimund
(74) *Attorney, Agent, or Firm* — Richard A. Wolf; Gregory Adams

(57)     ABSTRACT

A sealant device for a sealant for sealing a vehicle tire, including a closure unit with two openings, the first opening configured for the air inlet and the second opening configured for the sealant outlet and a tube is arranged at the first opening, which extends into the device and through which the air can flow into the device At the end of the tube, the first opening has a first sealing element and the second opening has a second sealing element. A puncture repair kit includes the sealant device and a pressure source. A method for producing the sealant device includes: manufacture of a housing section by blow molding or injection molding, manufacture of a closure unit with two openings by injection molding, and connecting of the housing section to the (Continued)

closure unit to form a sealant device by means of ultrasound or snap-on closure or via a bayonet closure.

13 Claims, 3 Drawing Sheets

(56) References Cited

U.S. PATENT DOCUMENTS

| | | | | |
|---|---|---|---|---|
| 2004/0000365 | A1 | 1/2004 | Eckhardt | |
| 2006/0217662 | A1 | 9/2006 | Hickman | |
| 2008/0230142 | A1 | 9/2008 | Hickman | |
| 2014/0224380 | A1* | 8/2014 | Kono | B29C 73/166 |
| | | | | 141/37 |
| 2021/0276289 | A1* | 9/2021 | Gschwender | B29C 73/166 |

FOREIGN PATENT DOCUMENTS

| | | | | |
|---|---|---|---|---|
| DE | 102012108822 | A1 | 3/2013 | |
| EP | 1299227 | B1 | 10/2004 | |
| EP | 2090419 | A1 | 8/2009 | |
| EP | 2740586 | A1 | 6/2014 | |
| EP | 1931509 | B1 | 7/2017 | |
| JP | 2007168418 | A * | 7/2007 | B29C 73/166 |

OTHER PUBLICATIONS

CN office Action dated Feb. 4, 2024 of counterpart Chinese Application No. 202180098989.2.

* cited by examiner

SEALANT DEVICE FOR SEALING A VEHICLE TYRE, PUNCTURE REPAIR KIT WITH SUCH A SEALANT DEVICE AND A METHOD FOR PRODUCING SUCH A SEALANT DEVICE

CROSS-REFERENCE TO RELATED APPLICATIONS

The present application is a National Stage Application under 35 U.S.C. § 371 of International Patent Application No. PCT/DE2021/200234 filed on Dec. 2, 2021, and claims priority from German Patent Application No. 10 2021 205 682.2 filed on Jun. 4, 2021, the disclosures of which are herein incorporated by reference in their entireties.

TECHNICAL FIELD

The invention relates to a sealant device for sealing a vehicle tire, a puncture repair device with such a sealant device, and a method for producing and the use of a sealant device.

BACKGROUND

Sealant devices are commonly used in puncture repair kits to pump the sealant into a vehicle tire using a compressor and seal the vehicle tire in the event of a puncture. For this purpose, the sealant containers are usually sealed with a seal, which is cut by a cutting mechanism on the compressor on use. Alternatively, a sealing cap is used, which is ejected when compressed air flows in.

Sealant containers are known, for example, from EP 1931509 B1, in which a device for sealing inflatable objects is described. The device has two openings, wherein air is introduced into the container via a side valve, which builds up pressure in the container. The compressed air causes the sealant to be pushed out via a centrally arranged tube and an outlet opening. A sealing element is arranged in the tube, which only opens at a certain pressure. Such a described container has disadvantages with regard to the stability of the container in the build-up of the pressure. Furthermore, such a container can only conditionally guarantee safe handling of the container during use since the sealant may easily escape when the container is opened.

SUMMARY

The invention is based on the object of providing an improved sealant device, which guarantees safe handling of the device in the case of use. Furthermore, the object of the invention is to provide a puncture repair kit, by way of which a vehicle tire can be safely sealed in the event of a puncture and improved handling of the device is ensured. In addition, the object of the invention is to provide a method for producing a sealant device, by way of which the device becomes more stable and thus safer in use.

The object of the invention is achieved by a sealant device for a sealant for sealing a vehicle tire comprising a closure unit with two openings, wherein the first opening is configured for the air inlet and the second opening is configured for the sealant outlet and a tube is arranged at the first opening, which extends into the device and through which the air can flow into the device, wherein, at the end of the tube, the first opening has a first sealing element and the second opening has a second sealing element.

Advantageously, the construction of such a sealant device leads to improved and safe handling. For example, no sealant can escape from the device. The sealing elements close the device until use and are designed in such a way that they only allow the intake of the air with the connection of a compressor and the build-up of a pressure and/or the escape of the sealant with the connection of a hose/valve. The user can use the sealant device according to the invention in the event of a puncture, without sealant running from the first opening for the air inlet, for example into a compressor, whereby the device and in particular the compressor can become unusable. The sealant device according to the invention guarantees the user that the air can be admitted into the device unhindered via the first opening in order to build up a pressure in the device and to convey the sealant out of the second opening.

The first sealing element seals the tube, which is arranged at the first opening and thus prevents the air from entering the device via the first opening. Only when a certain pressure is reached above normal pressure does the sealing element open and allow the air to flow into the device, so that a pressure is built up in the cylinder. Furthermore, the first sealing element is designed so that no sealant can escape from the inside of the device via the tube through the first opening.

The second sealing element at the second opening essentially prevents sealant from being able to escape. Leakage of the sealant via the second opening is only desired when the opening is connected to a vehicle valve, for example via a hose.

The sealant device comprises at least one closure unit, which is firmly and thus not detachably connected to a housing section. The closure unit and at least one housing section form the sealant device in which the sealant is located. It is advantageous that the sealant device thus achieves the necessary stability in order to maintain the pressure in the cylinder and ensure the removal of the sealant safely. The closure unit comprises at least the two openings and the tube, which is arranged at the first opening and is usually formed as a component. Advantageously, the closure unit is formed as a component, as it thus gives the sealant device more stability.

In one preferred embodiment of the invention, the first sealing element is formed such that it can be detached from the end of the tube. When a pressure is built up above normal pressure, the first sealing element is conveyed into the interior of the device, so that the pressure build-up in the interior of the device is then possible in order to convey the sealant out via the second opening. The first sealing element is particularly preferably releasable only in the flow direction of the incoming air. This is advantageous because the sealing element is released in the direction of the interior of the device and thus does not hinder the entry of the air for the pressure build-up.

In another preferred embodiment, the tube extends from the first opening as far as the rear third of the device, particularly preferably as far as the rear fifth of the device. This is advantageous because both openings are usually arranged on the same side of the device and the pressure inside the device can be built up in the rear part opposite the first opening to easily convey the sealant out. Usually, the device is connected with the first opening facing downward to an air pressure source, so that the pressure is ideally first built up in the rear section of the device. It is advantageous that the sealant can thus be efficiently conveyed out of the device.

Furthermore, the second sealing element is preferably a seal, particularly preferably a seal comprising aluminum. The second sealing element advantageously opens when a hose is connected to the second opening. A cutting device in the hose connection is conceivable, which destroys the second sealing element during connection and thus opens the access.

In another preferred embodiment, the first opening is connectible to a compressor. The first opening for the air inlet is usually connected to a compressor or to a compressor unit. For this purpose, the first opening is designed in such a way that it can form a fixed, but releasable connection to a compressor. Typically, the compressor is used multiple times, while the sealant device is used only once. Different configurations of the first opening are conceivable. For example, the first opening may have a click or rotation mechanism. Advantageously, the first opening is designed such that an airtight connection to a compressor can be made to build up pressure in the device generated in the compressor via the air inlet.

Furthermore, the second opening is indirectly connectible to a vehicle valve, in particular via a hose. The second opening is advantageously designed such that it can at least be connected to a vehicle valve, usually via a hose, such that the sealant can be conveyed from the sealant device into the vehicle tire. The second opening may have, furthermore, an additional closure option to protect the opening with a cap. A protection means can be advantageous to prevent the seal at the second opening from being destroyed during transport.

In another preferred embodiment, the second opening is arranged substantially perpendicularly with respect to the first opening. Usually, the sealant device is connected via the first opening to an air source, in particular a compressor. A substantially vertical arrangement of the second opening is advantageous, since the conveying of the sealant out of the device takes place much more efficiently. Moreover, such an arrangement is substantially easier for the user to operate, as the second opening for connecting a hose is easier to access.

The closure unit is further preferably connected to the housing section such that it cannot be detached. It is an essential advantage of the device if the closure unit is not detachably connected to the housing section, since the risk of leakage of sealant is reduced. Furthermore, the device is substantially more stable. This is particularly advantageous when pressure is built up in the interior of the device in order to transport the sealant out.

Furthermore, the connection between the closure unit and the housing section is preferably connected by means of ultrasound or snap closure. It has been found to be advantageous that a connection produced by means of ultrasound between the closure unit and the housing section is extremely stable. Usually, such a connection cannot be released. In one particularly preferred embodiment, the connection by means of ultrasound is not detachable. A snap closure is advantageously stable and leads to the fact that the closure unit and the housing section can be easily connected.

Furthermore, the object of the invention is achieved by a puncture repair kit comprising a described sealant device and a pressure source, preferably a compressor unit. The pressure source is preferably a compressor unit or a compressor. The pressure source is configured to introduce air into the sealant device via the first opening. To this end, the pressure source or the compressor unit has a connection which can be connected to the first opening of the sealant device. Advantageously, such a puncture repair kit is much safer to operate, since the sealant cannot flow back into the compressor unit. The user can thus seal a vehicle tire more safely and easily in the event of a puncture.

Furthermore, the object of the invention is achieved by a method for producing a described sealant device comprising the steps:

manufacture of a section of the housing by means of blow molding methods or injection molding methods, manufacture of a closure unit with two openings by means of injection molding methods, and connecting of the housing section to the closure unit to form a sealant device by means of ultrasound or via a snap closure or via a bayonet closure.

Advantageously, the sealant device, produced by such a method, is significantly more stable and safer in handling. The sealant cylinder is subjected to a pressure in case of use in order to convey the sealant out of the device. One advantage is that the closure unit is formed as a component and is firmly connected to a housing section, so that the device can withstand the pressure. Usually, the closure unit comprises a tube which is arranged at the first opening and is likewise part of this component.

Furthermore, the device is usually filled with a sealant before connecting the housing section to the closure unit. By subsequently connecting the device, the device is securely closed and cannot be opened again for the user at the connection points between the housing section and the closure unit. For example, for an unreleasable connection, this is welded tightly so that no sealant can escape from the device.

Furthermore, the invention relates to the use of the described sealant device in a puncture repair kit for sealing a vehicle tire. Advantageously, the sealant device is used in puncture repair kits to seal vehicle tires efficiently and safely in the case of use.

Further advantages and features of the sealant device according to the invention as well as of the puncture repair kit and of the method result from the dependent claims, which refer to advantageous embodiments of the present invention and as such are not to be understood restrictively. The invention also encompasses combinations of the features of different dependent claims where technically possible, even if the dependent claims do not relate to one another or if they belong to different claim categories. Furthermore, combinations of preferred and particularly preferred embodiments among one another can be combined with each other as far as these are technically possible. This is also true of the individual features of the exemplary embodiments discussed hereinafter to the extent that a person skilled in the art is unable to recognize these as necessarily belonging together.

BRIEF DESCRIPTION OF THE DRAWINGS

Further details and advantages of the present invention result from the following description of the exemplary embodiments in conjunction with the drawings. In the drawings.

DETAILED DESCRIPTION

Figure 1:
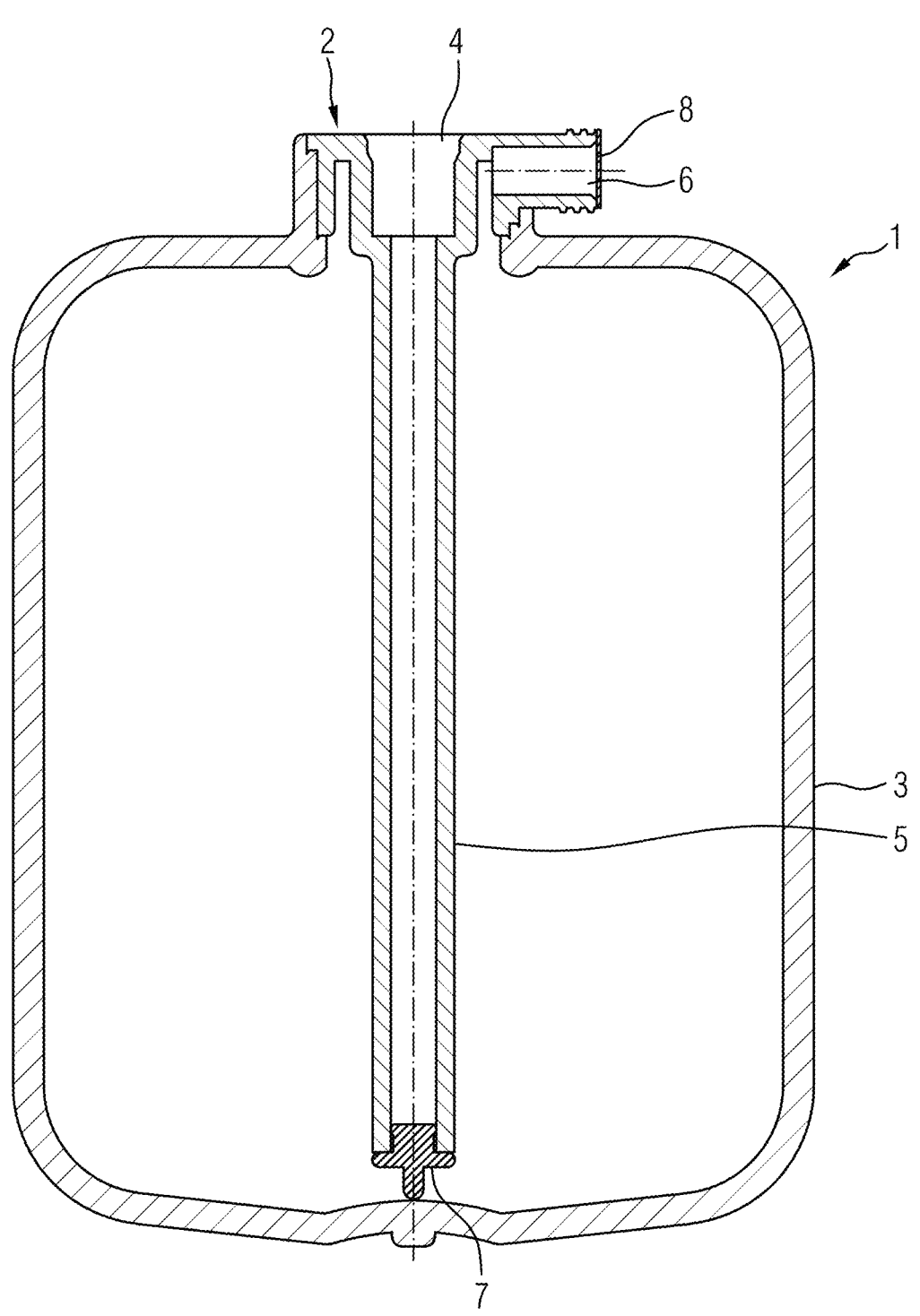
FIG. 1 shows a cross-sectional view of one embodiment of the sealant device according to the invention.

FIG. 1 shows a cross-sectional view of one embodiment of the sealant device 1 according to the invention with a closure unit 2 and a housing section 3. The closure unit 2 is firmly connected to the housing section 3 and comprises a first opening 4, at which a tube 5 is arranged. The tube 5 extends into the rear portion of the interior of the sealant device 1. Further, the closure unit 2 comprises a second opening 6 which is arranged substantially perpendicularly with respect to the first opening 4. On the end of the tube 5, a first sealing element 7 made of rubber in the form of a plug is arranged, which prevents the air intake via the first opening 4 through the tube 5. The first sealing element 7 has a ring on which the sealing element 7 can be plugged onto the end of the tube 5. Thus, the first sealing element 7 can only be pressed in the direction of the interior of the sealant device 1 when building up a pressure in the tube 5, so that sealant can subsequently be pumped out via the second opening 6. The second opening 6 has a second sealing element 8, which is configured in the form of a seal of aluminum. The seal is destroyed when a hose is plugged onto the second opening 6, whereby the sealant can only then be pumped out of the second opening 6.

Figure 2:
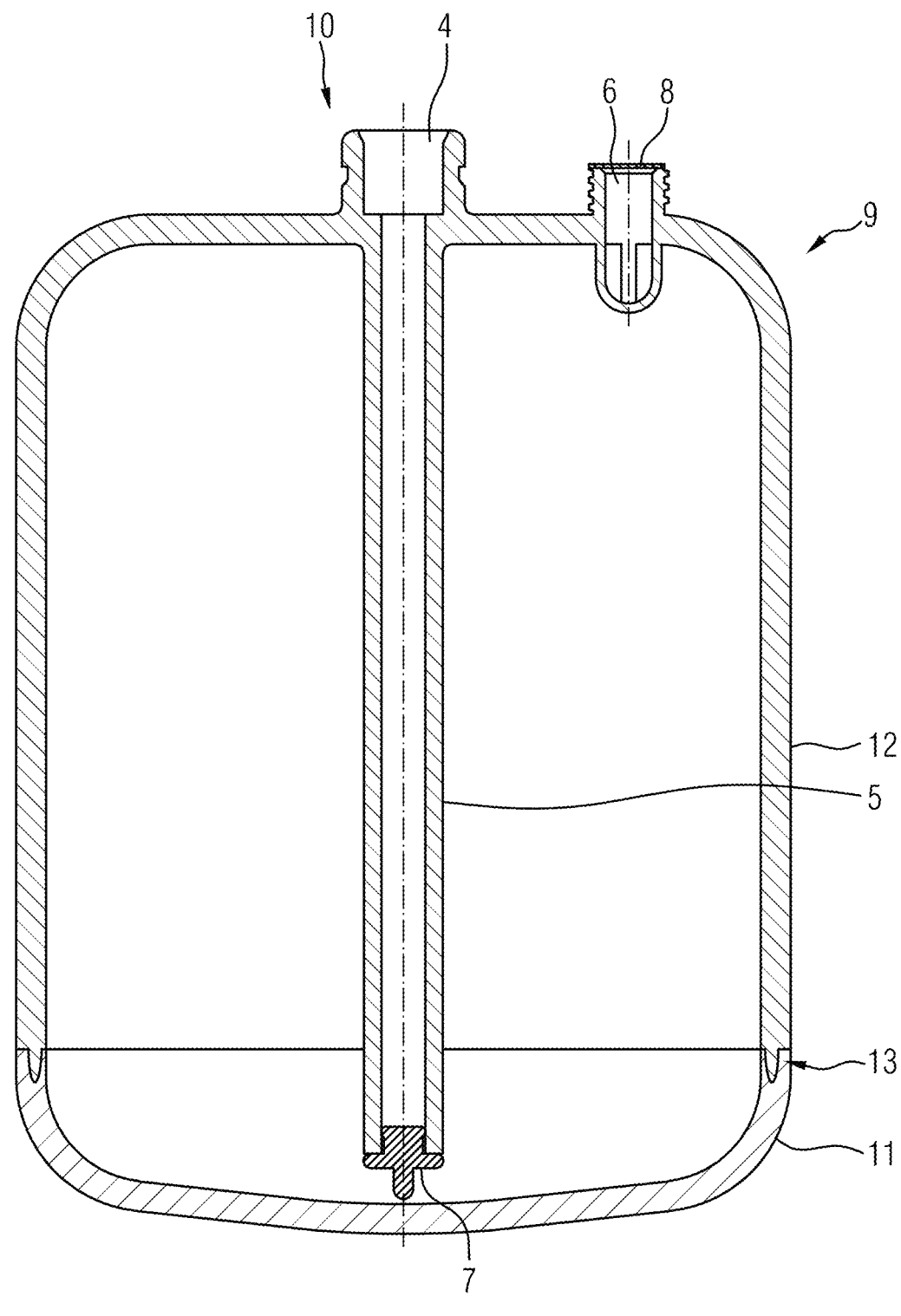
FIG. 2 shows a cross-sectional view of a further embodiment of the sealant device according to the invention.

FIG. 2 shows a cross-sectional view of a second embodiment of the sealant device 9 according to the invention, comprising a closure unit 10 and a housing section 11. The closure unit 10 has a first opening 4 and a second opening 6, wherein a tube 5 extends from the first opening 4 into the interior of the sealant device 9. The closure unit 10 has side walls 12, which serve as a device wall or boundary and can be firmly connected to the housing section 11. To this end, the housing section 11 is welded to the closure unit 10 at the closure limit section 13 after the sealant has been introduced into the sealant device 9. The second opening 6 is arranged adjacent to the first opening 4 by a device wall portion. The second opening 6 has a second sealing element 8 in the form of a seal. The first opening 4 is closed by a first sealing element 7 at the end of the tube 5 and is released by a pressure above normal pressure in the interior of the device 9.

Figure 3:
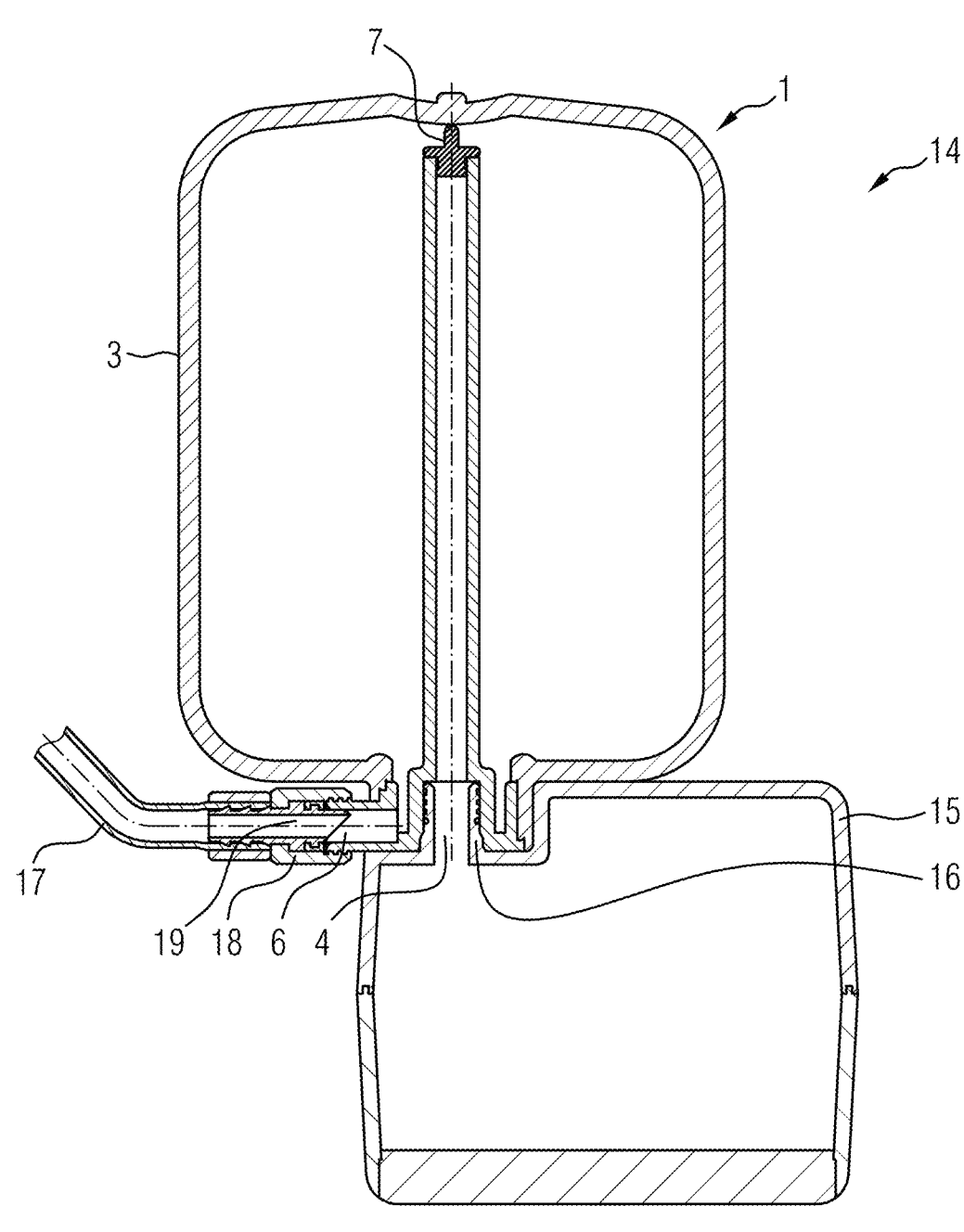
FIG. 3 shows a cross-sectional view of a puncture repair kit.

FIG. 3 shows a cross-sectional view of a puncture repair kit 14 with a sealant device 1, which is connected to a compressor unit 15 via a first connecting element 16. The compressor in the compressor unit 15 builds up air pressure, wherein the air enters the tube 5 through the first opening 4. As soon as a certain pressure is built up, the first sealing element 7 is conveyed into the interior of the device 1. Furthermore, a hose 17 is situated at the second opening 6, which hose 17 is connected at its other end to a valve via a second connecting element 18. The second connecting element 18 has an integrated cutting device 19, which cuts the second sealing element 8 when connecting the hose 17. If sufficient pressure is built up via the compressor unit 15 in the case of use in the sealant device 1, the sealant is conveyed through the second opening 6 via the hose 16 into the vehicle tire to seal it.

LIST OF DESIGNATIONS

1 First embodiment of the sealant device
2 Closure unit
3 Housing section
4 First opening
5 Tube
6 Second opening
7 First sealing element
8 Second sealing element
9 Second embodiment of the sealant device
10 Closure unit of the second embodiment
11 Housing section of the second embodiment

12 Side walls
13 Closure limit section
14 Puncture repair kit
15 Compressor unit
16 First connecting element
17 Hose
18 Second connecting element
19 Integrated cutting device

The invention claimed is:

1. A sealant device for a sealant for sealing a vehicle tire, comprising:
 a housing for containing the sealant, the housing including a housing section and closure unit operably coupled to the housing section, the closure unit having first and second openings, wherein the first opening is configured as an air inlet for permitting air into the housing, and the second opening is configured as a sealant outlet for permitting the sealant to exit the housing,
 a tube having an internal passage, the tube being arranged to fluidly connect its internal passage with the first opening of the closure unit, wherein the tube extends into the housing and has a tube outlet within the housing through which air can flow from the first opening through the internal passage and into the housing,
 a first sealing element configured to close air flow through the tube outlet when in a closed state, wherein the first sealing element is movable to an open state in response to air pressure via the first opening which thereby opens air flow through the tube outlet and permits air to flow from the first opening through the internal passage and into the housing, and
 a second sealing element that closes the second opening,
 a hose connector at the second opening for fluidly connecting hose to the device, the hose connector having an integrated cutting device configured to cut the second sealing element in response to insertion of the hose;
 wherein the second sealing element is configured as a destructible closure that is fixed in relation to the second opening and which is configured to only permit opening of the second opening upon destruction of the second sealing element via cutting with the integrated cutting device.

2. The device as claimed in claim 1, wherein the tube outlet is located at an axial end of the tube, wherein the first sealing element is arranged at the tube outlet and is formed such that it can be detached from the end of the tube when moved into the open state.

3. The device as claimed in claim 2, wherein the tube extends from the first opening as far as the rear third of the housing.

4. The device as claimed in claim 1, wherein the first opening can be connected to a compressor.

5. The device as claimed in claim 1, wherein the second opening can be indirectly connected to a vehicle valve.

6. The device as claimed in claim 1, wherein the second opening is arranged substantially perpendicularly with respect to the first opening.

7. The device as claimed in claim 1, wherein the closure unit is not detachably connected to the housing section.

8. The device as claimed in claim 1, wherein the connection between the closure unit and the housing section is connected by means of ultrasound or snap closure.

9. A puncture repair kit, comprising the sealant device as claimed in claim 1 and a pressure source.

10. A method for producing the sealant device as claimed in claim 1, comprising the steps:

manufacturing the housing section by blow molding or injection molding, manufacturing the closure unit with the first and second openings by injection molding, and connecting the housing section to the closure unit to form the housing of the sealant device by ultrasound or via a snap-on closure or via a bayonet closure.

11. The device as claimed in claim 1, wherein the first sealing element is a plug at the tube outlet, the plug having a seat that engages an end face of the tube outlet when in the closed state such that the plug is movably detachable from the tube outlet only in the flow direction of incoming air via the first opening.

12. The device as claimed in claim 1, wherein the second sealing element is a foil seal attached to an end face of the second opening.

13. A sealant device for a sealant for sealing a vehicle tire, comprising:

a housing for containing the sealant, a first opening configured as an air inlet that can permit air into the housing, and a second opening configured as a sealant outlet that can permit the sealant to exit the housing, a tube having an internal passage, the tube being arranged to fluidly connect the internal passage with the first opening, wherein the tube extends into the housing and has a tube outlet within the housing through which air can flow from the first opening through the internal passage and into the housing, a first sealing element configured to close the tube outlet when in a closed state, wherein the first sealing element is movable to an open state in response to air pressure via the first opening which thereby opens the tube outlet and permits air to flow from the first opening through the internal passage and into the housing, and a second sealing element that closes the second opening, a hose connector at the second opening for fluidly connecting hose to the device, the hose connector having an integrated cutting device configured to cut the second sealing element in response to insertion of the hose;

wherein the second sealing element is configured as a destructible closure that is fixed in relation to the second opening and which is configured to only permit opening of the second opening upon destruction of the second sealing element via cutting with the integrated cutting device.

* * * * *